(12) United States Patent
Roberts et al.

(10) Patent No.: US 6,982,034 B2
(45) Date of Patent: Jan. 3, 2006

(54) UNDERDRAIN SYSTEM

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 64 days.

(21) Appl. No.: 09/948,798

(22) Filed: Sep. 10, 2001

(65) Prior Publication Data

US 2003/0047502 A1 Mar. 13, 2003

(51) Int. Cl.
*B01D 24/22* (2006.01)

(52) U.S. Cl. .................................. 210/232; 210/293
(58) Field of Classification Search ............... 210/289, 210/291, 293, 232
See application file for complete search history.

(56) References Cited

U.S. PATENT DOCUMENTS

| | | | | |
|---|---|---|---|---|
| 1,151,313 A | * | 8/1915 | Wheeler | 210/293 |
| 4,619,765 A | | 10/1986 | Roberts | 210/289 |
| 5,028,322 A | * | 7/1991 | Soriente | 210/232 |
| 5,108,627 A | | 4/1992 | Berkebile | 210/793 |
| 5,149,427 A | * | 9/1992 | Brown et al. | 210/274 |
| 5,269,920 A | | 12/1993 | Brown | 210/274 |
| 5,462,664 A | | 10/1995 | Neuspiel | 210/274 |
| 5,489,388 A | | 2/1996 | Brown | 210/794 |
| 6,110,366 A | * | 8/2000 | Hunkele et al. | 210/232 |
| 6,190,568 B1 | | 2/2001 | Hunkele | 210/767 |
| 6,325,931 B1 | | 12/2001 | Roberts | 20/293 |
| 6,569,327 B2 | | 5/2003 | Roberts | 210/274 |
| 6,615,469 B1 | | 9/2003 | Burcham | 29/401.1 |

OTHER PUBLICATIONS

Technical Bulletin No. 700.2 dated Apr. 197, pp. 1 to 12.
Enlarged Drawing of Microwedge Strainer.
"Water Marks," pp. 1 and 2; Jan. 1995.
"Retroliner™ Rehabilitation System for Monolithic Wheeler Underdrains Product Specifications," pp. 1 and 2.
"Gravity Filter Underdrain," Jan. 1981.
"Infinity Continuous Lateral Underdrain" 1999.

* cited by examiner

*Primary Examiner*—Ivars C. Cintins
(74) *Attorney, Agent, or Firm*—Merek, Blackmon & Voorhees, LLC

(57) ABSTRACT

An underdrain system having a bottom formed of concrete. The concrete bottom includes a plurality of generally cone shaped depressions formed therein. A porous plate is operably associated with at least one of the generally cone shaped depressions. The underdrain system further includes an insert having at least one distribution orifice for distributing the flow. The insert is positioned beneath the porous plate and at least partially within the at least one generally cone shaped depression. The insert insures thorough distribution of any fluid passing through the porous plate, i.e., the fluid is evenly distributed over the entire surface area of the porous plate. In an alternative embodiment, an underdrain system is provided including a bottom formed of concrete. The bottom has a plurality of generally cone shaped depressions formed therein. A porous plate is operably associated with at least one of the generally cone shaped depressions. The underdrain system further includes a removable anchoring member for removably anchoring the porous plate to the concrete bottom without penetrating any surface of the concrete bottom.

13 Claims, 6 Drawing Sheets

UNDERDRAIN SYSTEM

FIELD OF THE INVENTION

The present invention is directed to significant improvements to underdrain systems generally and in particular false bottom (e.g., pre-cast and/or monolithic) underdrain systems that are used in filter systems for filtering water and wastewater.

BACKGROUND OF THE INVENTION

Various underdrain systems have been developed for filter systems that filter water and wastewater. One commonly used underdrain system is a monolithic false bottom underdrain system. This underdrain system typically includes a cast in place concrete structure that overlays the structural floor or true bottom of the filter housing or compartment. The concrete structure includes a plurality of cone shaped depressions formed therein. "Cone shaped" as used herein includes within its definition pyramidal shaped depressions. A thimble is disposed at the lowermost point of the cone shaped depressions. Fluid flows through the thimble and corresponding cone shaped depressions during the various cycles of operation of a filter including the filtration mode and backwashing or washing mode. Fourteen porcelain spheres are commonly disposed in each of the cone shaped depressions. Five of the porcelain spheres are approximately 3 inches in size, one of the porcelain spheres is approximately 1⅜ inches in size and the eight remaining porcelains spheres are approximately 1¼ inches in size. One of the 3 inch porcelain spheres is disposed directly over a porcelain thimble positioned in the bottom of the cone shaped depression. The remaining four 3 inch balls are disposed directly above the porcelain sphere positioned over the porcelain thimble. The 1⅜ inch porcelain sphere is located in center of the four 3 inch porcelain spheres. The remaining eight 1¼ inch porcelain spheres are positioned on the outer periphery of the four 3 inch porcelain spheres. The porcelain balls are expensive and time-consuming to install. Further, it is important to insure that the balls are spherical to insure that the balls do not spin owing to the flow of water passed the balls. This spinning can cause undue wear on the walls of the depressions. Testing of the porcelain balls to insure that they are spherical is time-consuming and expensive. The porcelain balls are also subject to becoming dislodged from the corresponding depression. This can lead to significant problems with the operation of the filter.

Another commonly employed underdrain system is a pre-cast wheeler bottom. This type of underdrain system was shipped in blocks of specific sizes such as 2'×2' as opposed to a monolithic false bottom underdrain system as previously described. The pre-cast blocks are positioned on concrete walls in the filter housing or compartment. A plurality of depressions are formed in the pre-cast blocks. A plurality of porcelain spheres are disposed in each of the depressions. This underdrain system suffers from similar drawbacks to the monolithic false bottom underdrain systems.

A pyramidal shaped liner has been employed in the depressions of the concrete bottoms where the walls have deteriorated. However, this pyramidal shaped liner formed from plastic only addressed the structural deficiency of the walls and still required the use of numerous porcelain spheres or balls.

U.S. Pat. No. 6,190,568 discloses retrofitting a monolithic false bottom filter underdrain system by replacing the porcelain balls with one or more porous plates. The primary if not exclusive reason for substituting the porcelain balls with a porous plate stated in U.S. Pat. No. 6,190,568 is to obviate one or more gravel support layers that are sometimes used with monolithic false bottom underdrain systems. The porous plates are permanently anchored to the concrete bottom of the monolithic false bottom underdrain system. Specifically, U.S. Pat. No. 6,190,568 teaches anchoring the porous plates to the concrete bottom by embedding an anchor in the concrete bottom.

There are numerous disadvantages to the retrofit underdrain system disclosed in U.S. Pat. No. 6,190,568. One principal disadvantage is that the porcelain balls are replaced with an inferior fluid distributor. Specifically, unlike the porcelain balls, porous plates are not particularly good distributors. This causes significant problems during the operation of the filter. For example, fluid directed through a porous plate is more likely to pass through the central portion of the porous plate rather than be evenly distributed over the entire surface area of the porous plate. This results in maldistribution of the fluid in the filter bed. The retrofit underdrain system disclosed in U.S. Pat. No. 6,190,568 employs multiple layers of porous plates to achieve better distribution. However, adequate distribution is not achieved owing to the limitations on the distribution capabilities of the porous plate. Further, using multiple porous plates unnecessarily increases the cost of the retrofit underdrain system. The retrofit underdrain system disclosed in U.S. Pat. No. 6,190,568 is unnecessarily difficult and time-consuming to install. Specifically, embedding the anchoring members in concrete to permanently secure the porous plate to the concrete bottom is a difficult and time-consuming process due in part to the presence of reinforcing steel used in the concrete. Moreover, the porous plate cannot be readily replaced when necessary owing to its permanent attachment to the concrete bottom.

OBJECTS AND SUMMARY OF THE INVENTION

An object of the present invention is to provide a novel and unobvious underdrain system.

Another object of a preferred embodiment of the present invention is to provide a method for readily retrofitting a false bottom underdrain system.

A further object of a preferred embodiment of the present invention is to provide a kit for permitting an existing false bottom underdrain system to be readily modified to omit the porcelain spheres while simultaneously insuring thorough distribution of the fluid through a filter bed.

Still another object of the present invention is to provide an anchoring member for anchoring a porous plate to the concrete bottom of a false bottom underdrain system without penetrating any surface of the concrete bottom.

Still a further object of the present invention is to provide an anchoring member for removably anchoring a porous plate to the concrete bottom of a false bottom underdrain system thereby permitting rapid removal of the porous plate when necessary to replace the same.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an underdrain system having a bottom formed of concrete. The concrete bottom includes a plurality of generally cone shaped depressions formed therein. A porous plate is operably associated with at least one of the generally cone shaped depressions. The underdrain system further includes an insert having at least one distribution orifice for distributing the flow of a fluid. The insert is positioned beneath the porous plate and at least partially within the at least one generally cone shaped depression. The insert insures thorough distribution of any fluid passing through the porous plate, i.e., the fluid is evenly distributed over the entire surface area of the porous plate.

In another embodiment of the present invention, an underdrain system is provided including a bottom formed of concrete. The bottom has a plurality of generally cone shaped depressions formed therein. A porous plate is operably associated with at least one of the generally cone shaped depressions. The underdrain system further includes a removable anchoring member for removably anchoring the porous plate to the concrete bottom without penetrating any surface of the concrete bottom.

A further embodiment of the present invention is directed to a method of retrofitting a false bottom filter underdrain system. The monolithic false bottom filter underdrain system includes a concrete bottom having a plurality of generally cone shaped depressions. The false bottom filter underdrain system further includes porcelain spheres positioned within the generally cone shaped depressions. The method includes the steps of:
(a) removing the porcelain spheres from at least one the plurality of generally cone shaped depressions; (b) replacing the porcelain spheres in at least one of the plurality of generally cone shaped depressions with a porous plate; and, (c) removably anchoring the porous plate to the concrete bottom without penetrating any surface of the concrete bottom (i.e., is not embedded in the concrete) so that the porous plate can be readily replaced when necessary.

Still another embodiment of the present invention is directed to a method of retrofitting a false bottom filter underdrain system. The false bottom filter underdrain system includes a concrete bottom having a plurality of generally cone shaped depressions. The false bottom filter underdrain system further includes porcelain spheres positioned within the generally cone shaped depressions. The method includes the steps of: (a) removing the porcelain spheres from at least one of the generally cone shaped depressions; (b) positioning an insert at least partially within the at least one generally cone shaped depression, the insert having at least one distribution orifice for distributing a fluid; and, (c) positioning a distribution plate above the insert.

Still a further embodiment of the present invention is directed to an underdrain system including a bottom formed of concrete. The concrete bottom has a plurality of generally cone shaped depressions formed therein. A distribution plate is operably associated with at least one of the generally cone shaped depressions. The underdrain system further includes an insert having at least one distribution orifice for distributing the flow of a fluid. The insert is positioned beneath the distribution plate and at least partially within the at least one generally cone shaped depression. A removable anchoring member is provided for removably anchoring the distribution plate to the bottom without penetrating any surface of the bottom.

Yet another embodiment of the present invention is directed to a method of retrofitting a false bottom filter underdrain system. The false bottom filter underdrain system includes a concrete bottom having a plurality of generally cone shaped depressions. The false bottom filter underdrain system further includes porcelain spheres positioned within the generally cone shaped depressions. The method includes the steps of: (a) removing the porcelain spheres from at least one of the generally cone shaped depressions; (b) positioning an insert at least partially within the at least one generally cone shaped depression, the insert having at least one distribution orifice for distributing a fluid; and, (c) positioning a distribution plate above the insert.

Yet still another embodiment of the present invention is directed to a kit for retrofitting a false bottom filter underdrain system. The false bottom filter underdrain system includes a concrete bottom having a plurality of generally cone shaped depressions. The false bottom filter underdrain system further includes porcelain spheres positioned within the generally cone shaped depressions. The kit includes a distribution plate which replaces the porcelain spheres in at least one of the generally cone shaped depressions upon installation. The kit also includes an insert having at least one distribution orifice for distributing the flow of a fluid. The insert is positioned beneath the distribution plate and at least partially within the at least one generally cone shaped depression upon installation. The kit further includes a removable anchoring member for removably anchoring the distribution plate to the concrete bottom without penetrating any surface of the concrete bottom.

Yet still a further embodiment of the present invention is directed to a kit for retrofitting a false bottom filter underdrain system. The false bottom filter underdrain system includes a concrete bottom having a plurality of generally cone shaped depressions. The false bottom filter underdrain system further includes porcelain spheres positioned within the generally cone shaped depressions. The kit includes a distribution plate having upper and lower surfaces. The distribution plate is substituted for the porcelain spheres in at least one of the generally cone shaped depressions upon installation. The kit also includes an insert having at least one distribution orifice for distributing the flow of a fluid. The insert has first, second and third surfaces, which extend in a common plane. The first, second and third surfaces of the insert engage the lower surface of the distribution plate upon installation to support the distribution plate.

DETAILED DESCRIPTION OF THE PREFERRED EMBODIMENTS OF THE INVENTION

The preferred forms of the invention will now be described with reference to FIGS. 1–6. The appended claims are not limited to the preferred embodiments and no term used herein is to be given a meaning other than its ordinary meaning unless it is expressly stated that the term shall have a special meaning. The only term in this Specification having a special meaning is the term "insert." The term "insert" does not include within its meaning a porous plate.

FIGS. 1 AND 2

Figure 1:
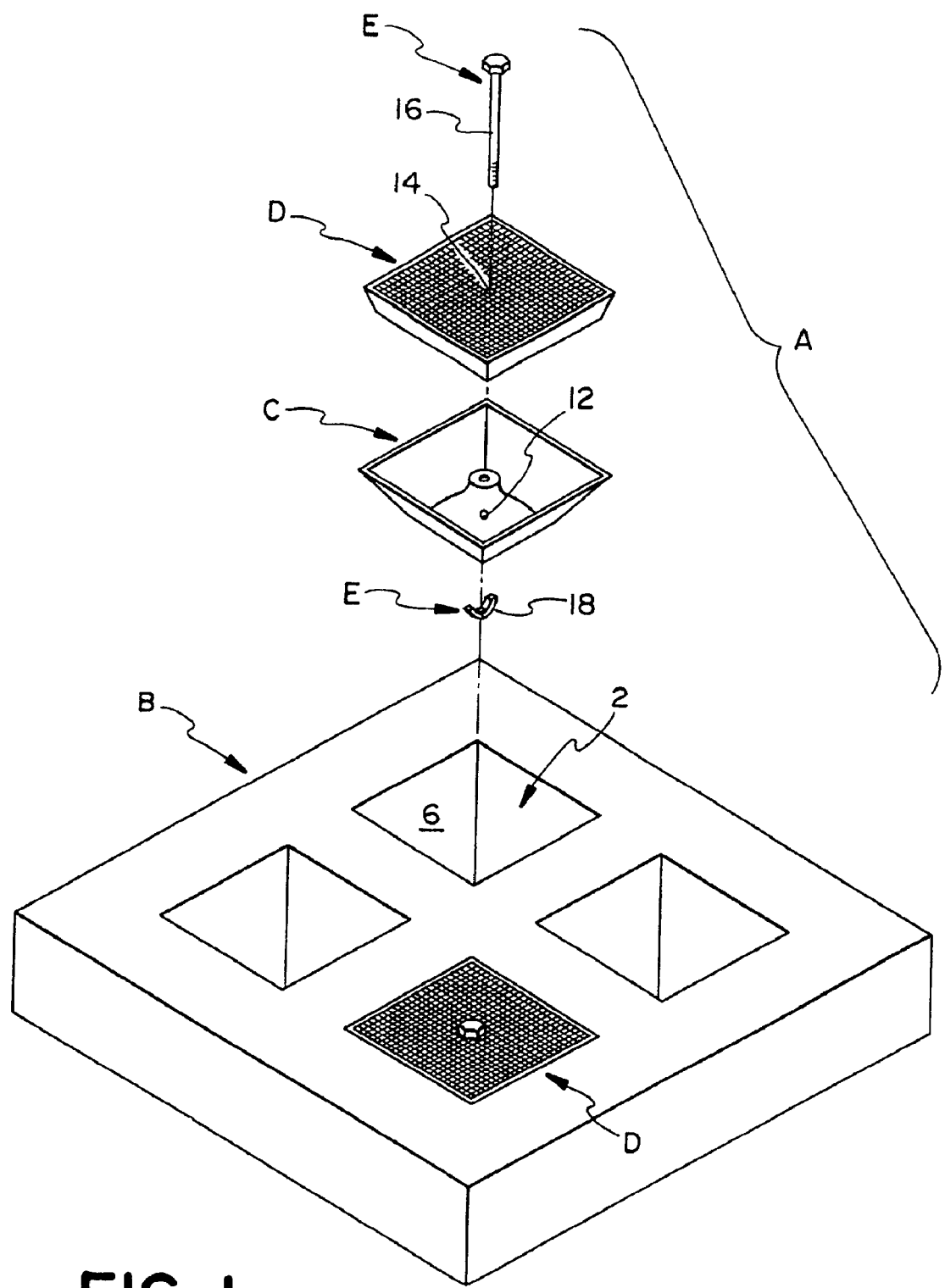
FIG. 1 is a partially exploded perspective view of a first preferred embodiment of the present invention.
Figure 2:
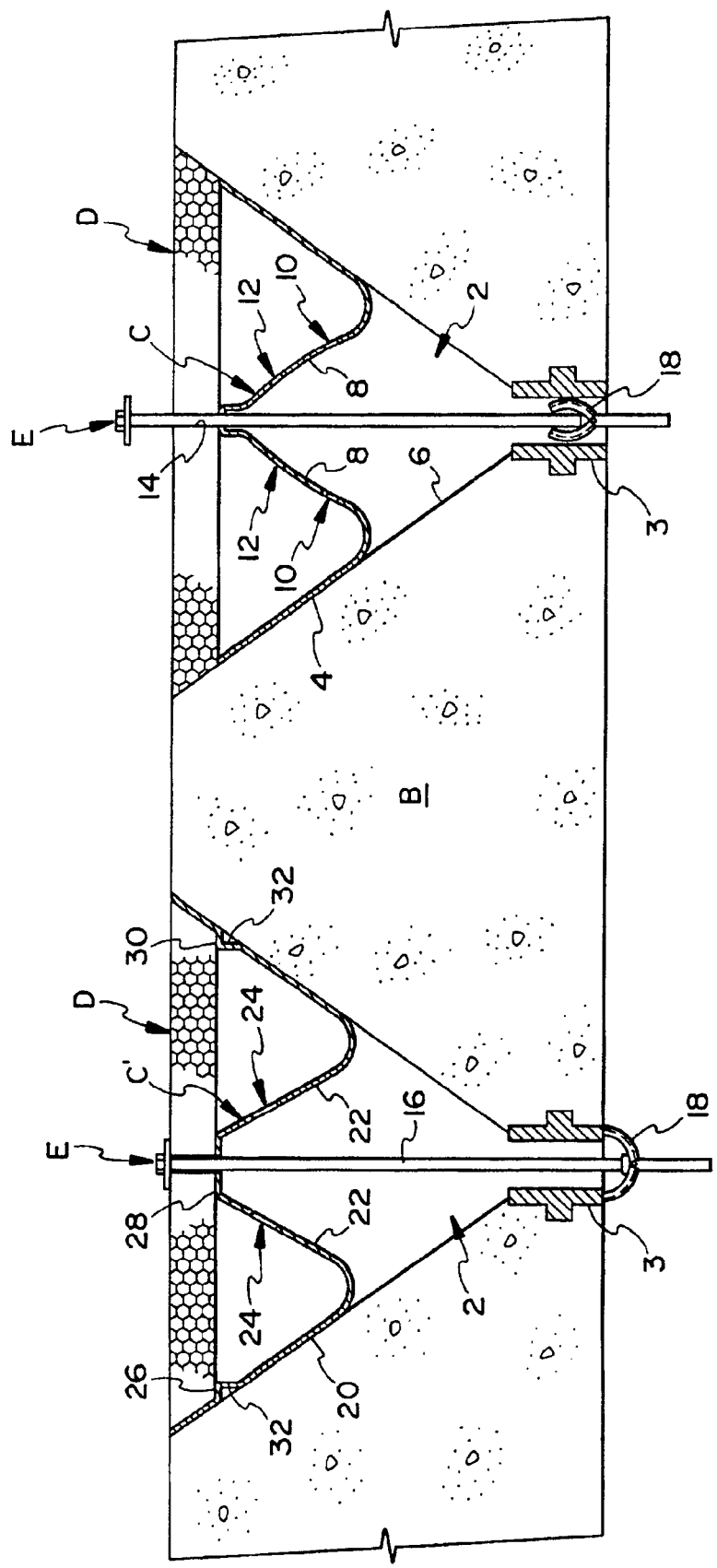
FIG. 2 is a cross-sectional view of two of multiple possible variations of the present invention.

Referring to FIGS. 1 and 2, an underdrain system A is depicted. The underdrain system includes a false bottom filter underdrain structure B, a plurality of distribution inserts C (only one of which is shown), a plurality of porous plates D, and a plurality of removable anchor assemblies E. The false bottom filter underdrain structure B is preferably formed of concrete and includes a plurality of underdrain hoppers 2. Where the false bottom is of the pre-cast type the underdrain structure will include one or more underdrain blocks. The number of underdrain blocks will vary depending on the size of a given filter. The underdrain hoppers 2 are generally cone shaped. Referring to FIG. 2, a thimble 3 is disposed at the lowermost portion of each of the hoppers 2. These hoppers, when the false bottom underdrain is originally installed, include a plurality of porcelain spheres (not shown). Typically, there is one large sphere centrally located in each of the hoppers 2 and four smaller spheres located adjacent the four corners of the hoppers 2.

During the process of retrofitting the false bottom filter underdrain structure B, all of the porcelain spheres are removed. Subsequently, the distribution insert C is positioned in the hoppers 2 such that the exterior walls 4 of the distribution insert C engage the inner walls 6 of hoppers 2. The distribution insert C includes an inner wall 8 having distribution orifices 10 and 12 formed therein. In filter systems utilizing both liquid and air, the lower distribution orifices 10 permit the flow of liquid therethrough while the upper distribution orifices 12 permit the flow of air therethrough. The upper and lower distribution orifices are oriented such that the flow of liquid and air is directed to insure even distribution of the fluids across the entire surface area of the porous plate D. This is achieved by orienting the inner wall of the distribution insert C such that it does not extend parallel to the porous plate D. Preferably, the distribution insert C is formed from polystyrene. However, it will be readily appreciated that any suitable material may be used.

The porous plate D is positioned above the distribution insert C. Preferably, the porous plate is positioned entirely within the corresponding hopper 2 and is supported at its edges by the distribution insert C. This arrangement enhances the seal between the porous plate and the inner walls of the hopper 2. Porous plate D has a centrally located opening 14 for receiving a portion of the removable anchor assembly E. Specifically, the removable anchor assembly E includes a bolt 16 and a toggle member 18. Preferably, these elements are made from stainless steel or plastic. Referring to FIG. 1, the toggle member is substantially U-shaped. The bolt 16 passes through the opening 14 of the porous plate D. As shown on the right hand side of FIG. 2, when the toggle member 18 is in the collapsed form, it can readily pass through the thimble 3. Further, as shown on the left hand side of FIG. 2, the toggle member 18 engages the thimble 3 in the extended or installed position. In this fashion, the porous plate D is secured to the underdrain structure B without penetrating any surface of the underdrain block B. In other words, fasteners are not embedded into the concrete underdrain structure B to secure the porous plate D thereto. This feature of the present invention significantly reduces the complexity of retrofitting the false bottom underdrains with porous plates. Further, it allows for rapid replacement of the porous plate D after prolonged use. Specifically, to replace the porous plate D one need only unscrew the bolt 16 which will cause toggle member 18 to work free and drop into the true bottom of the filter. To install a new porous plate one need only place a new toggle member on the bolt 16 and secure the same to the thimble 3 in the manner depicted on the left hand side of FIG. 2.

The shape of the toggle member 18 must allow for the flow of fluid through the thimble 3. In its preferred form, the toggle member 18 is U-shaped as explained above. However, it will be readily appreciated that any suitable shape may be used provided that such allows for the flow of fluid through the thimble 3.

Referring to the left hand side of FIG. 2, an alternative form of the distribution insert is depicted. Specifically, distribution insert C' is shown having outer walls 20 and inner walls 22. A plurality of distribution orifices 24 are formed on the inner walls 22. The distribution insert C' includes first segment 26, second segment 28 and third segment 30. These segments all extend in a common plane and engage the lower surface of the porous plate D to support the same. Further, the porous plate D is positioned entirely within the insert C'. This arrangement provides greater support and enhances the seal with the hopper 2. Recesses 32 are formed in the outer walls 20 of the distribution insert C'. A sealant may be placed in the recesses 32 to further enhance the seal with the hopper.

FIG. 3

Figure 3:
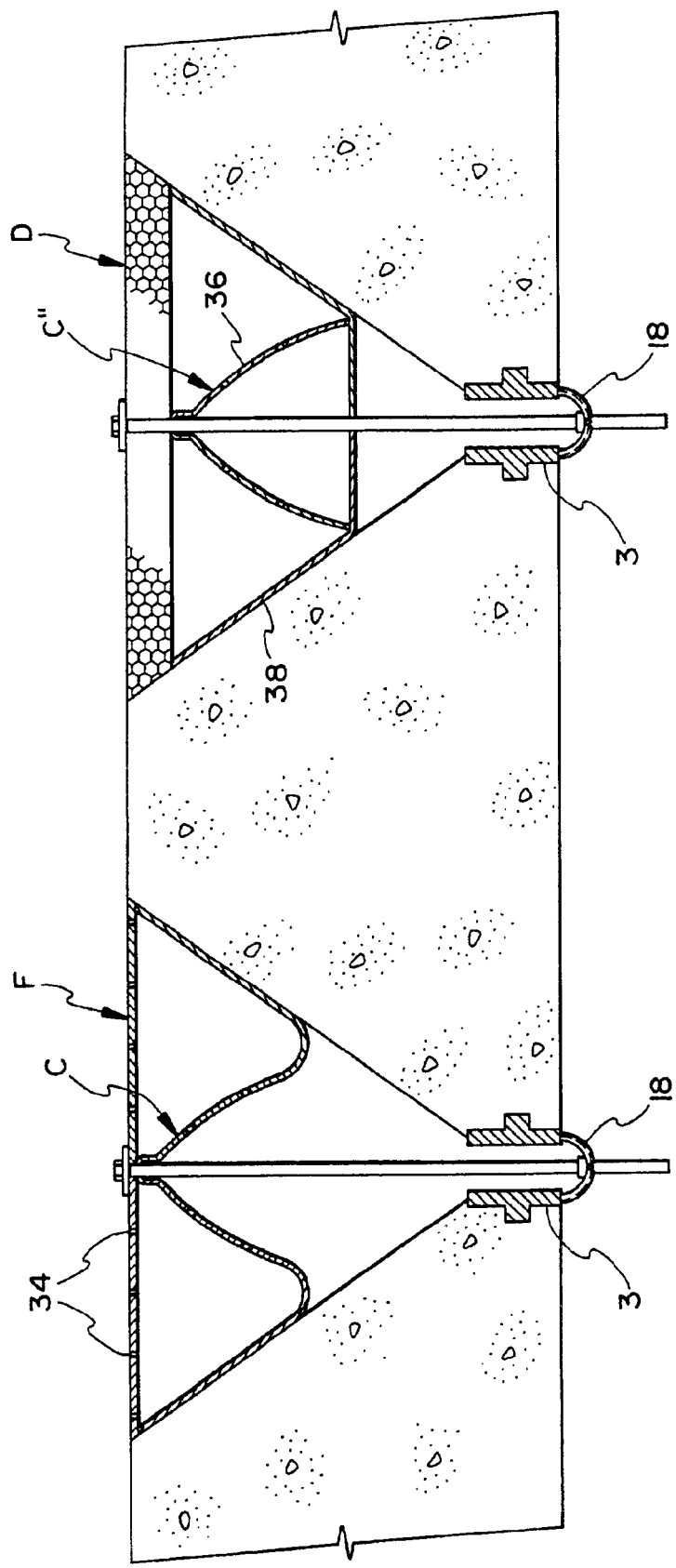
FIG. 3 is a cross-sectional view of two further variations of many possible variations of the present invention.

Referring to FIG. 3, the embodiment illustrated on the left hand side is similar to the embodiment depicted on the right side FIG. 2. Therefore, only the differences will be discussed in detail. Specifically, a distributor plate F is used in place of a porous plate. The distributor plate F may be formed from any suitable material. A plurality of openings 34 are formed in the distributor plate F to permit fluids to pass therethrough. The right had side of FIG. 3, depicts an alternative form of a distribution insert. Specifically, the distribution insert C" is formed from two pieces. The first piece 36 forms the inner wall of the distribution insert where the second piece 38 forms the outer walls.

FIG. 4

Figure 4:
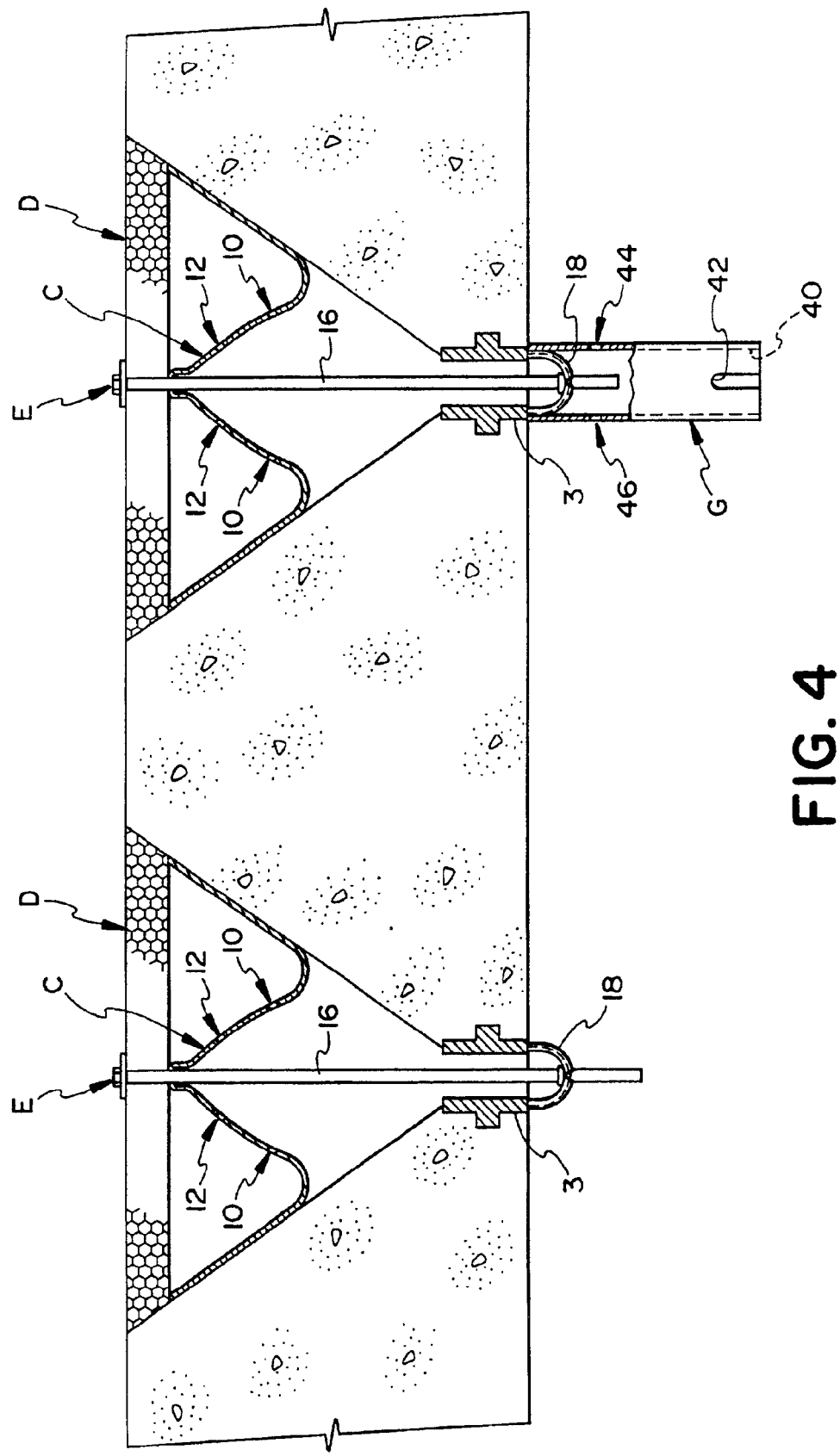
FIG. 4 is a cross-sectional view of a further variation of the present invention.

Referring to the right side of FIG. 4, another alternative embodiment is disclosed. The distribution insert C, porous plate D and removable anchor E are the same as the right hand embodiment depicted in FIG. 2. A tailpiece G is disposed directly beneath the thimble 3. As is readily evident for the right hand portion of FIG. 4, the tailpiece is connected in a fluid tight manner to thimble 3 while allowing the toggle member 18 to engage the thimble 3. The tailpiece G includes a liquid orifice 40 formed in the bottom thereof. The tailpiece further includes a primary air orifice 42 and secondary air orifices 44 and 46. A liquid, preferably water, flows through the liquid orifice 40 and thereby passes into thimble 3. Air flows through orifices 42, 44 and 46 and thereby passes into thimble 3. The tailpiece G allows the filter system to use both air and liquid during backwashing of the filter system.

FIG. 5

Figure 5:
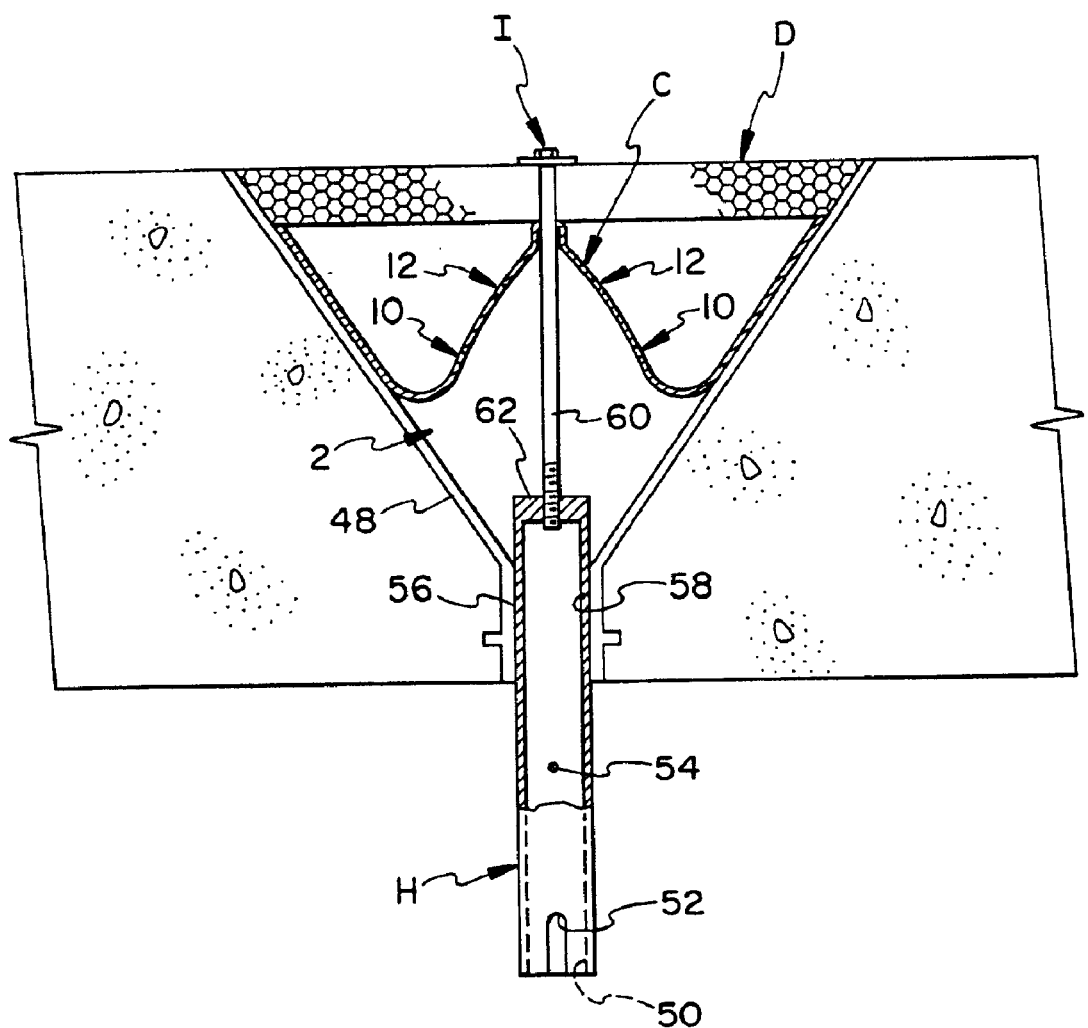
FIG. 5 is a cross-sectional view of still another variation of the present invention.

Referring to FIG. 5, a further version of the present invention is depicted. It should be noted that this version is preferably for new installations. The distribution insert C and porous plate D are the same as the right hand embodiment depicted in FIG. 2. A cast-in-place liner 48 is preformed in the hopper 2. A tailpiece H is disposed in the lowermost portion of the liner 48. The tailpiece H includes a liquid orifice 50, a primary air orifice 52 and a secondary air orifice 54. The tailpiece includes a pair of annular protrusions 56 which are snapped into annular recesses 58 of the lowermost portion of the liner 48. This arrangement allows the tailpiece H to be removably connected to the liner

48. It will be readily appreciated that other means may be provided for connecting the tailpiece H to liner 48. For example, the tailpiece H and liner 48 could be detachably connected via threads. Moreover, the tailpiece H could be permanently fixed to the liner 48 via conventional adhesives.

Anchor assembly I removably secures the porous plate D to the tailpiece H. The anchor assembly I includes a bolt 60 threaded into the top section 62 of tailpiece H. This arrangement permits rapid removal of the porous plate by merely unscrewing the bolt 60 from top section 62 of tailpiece H.

FIG. 6

Figure 6:
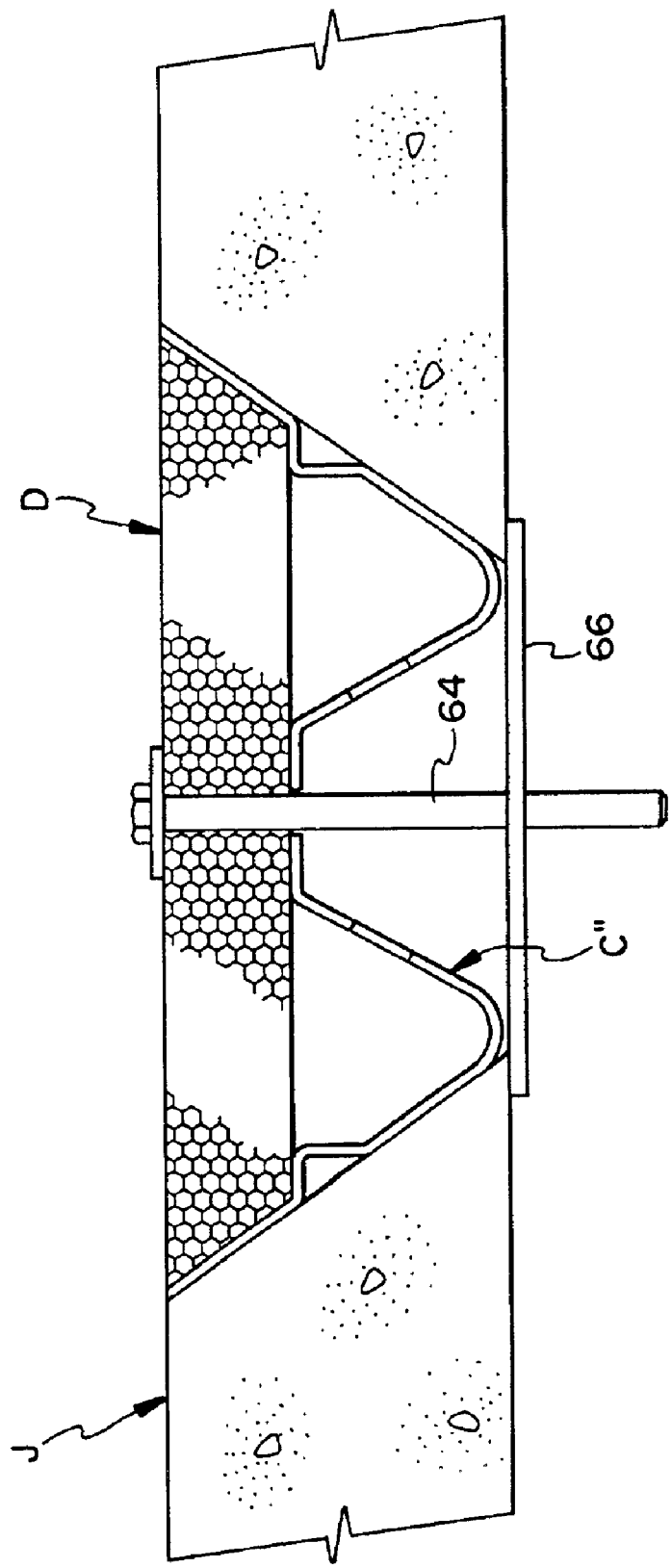
FIG. 6 is a cross-sectional view of yet another variation of the present invention.

Referring to FIG. 6, yet a further version of the present invention is disclosed. The distribution insert C'" and the porous plate D are the same as those elements in the embodiment depicted on the left hand side of FIG. 2. As seen from a comparison of FIGS. 2 and 6, the thickness of the underdrain structure J is considerably less than the thickness of underdrain structure B. This results in a significant material cost savings. The porous plate D is secured to the underdrain structure J by bolt 64 and plate 66. Plate 66 has a plurality of openings formed therein to permit fluids to pass therethrough.

While this invention has been described as having preferred designs, it is understood that it is capable of further modifications, uses and/or adaptions of the invention following in general the principle of the invention and including such departures from the present invention as come within the known customary practice in the art to which the invention pertains and as may be applied to the central features hereinbefore set forth, and fall within the scope of the invention and the limits of the appended claims.

We claim:

1. An underdrain system, comprising:
   (a) a bottom formed of concrete, said bottom having a plurality of generally cone shaped depressions formed therein;
   (b) a porous plate, said porous plate being at least partially disposed within at least one of said generally cone shaped depressions, said porous plate having a first opening formed therein; and,
   (c) a removable anchoring member for removably anchoring said porous plate to said bottom, said removable anchoring member extending into said first opening and into said generally cone shaped depression having said porous plate;
   (d) a thimble formed in a bottom of at least one of said generally cone shaped depressions; and,
   (e) said removable anchoring member includes upper and lower portions, said lower portion engages said thimble.

2. An underdrain system as set forth in claim 1, wherein:
   (a) said removable anchoring member includes a bolt and a toggle member.

3. An underdrain system as set forth in claim 2, wherein:
   (a) said toggle member is substantially U-shaped.

4. An underdrain system as set forth in claim 3, wherein:
   (a) said toggle member engages said thimble.

5. An underdrain system, comprising:
   (a) a bottom formed of concrete, said bottom having a plurality of generally cone shaped depressions formed therein;
   (b) a porous plate, said porous plate being at least partially disposed within at least one of said generally cone shaped depressions, said porous plate having a first opening formed therein; and,
   (c) a removable anchoring member for removably anchoring said porous plate to said bottom, said removable anchoring member extending into said first opening and into said generally cone shaped depression having said porous plate;
   (d) a liner disposed in at least one of said generally cone shaped depressions; and,
   (e) a tail piece removably secured to said liner.

6. An underdrain system as set forth in claim 5, wherein:
   (a) said removable anchoring member includes a bolt threaded into an upper portion of said tailpiece.

7. An underdrain system as set forth in claim 5, wherein:
   (a) said tailpiece is threaded onto said liner.

8. An underdrain system as set forth in claim 5, wherein:
   (a) said tailpiece is snapped into said liner.

9. An underdrain system, comprising:
   (a) a bottom formed of concrete, said bottom having a plurality of generally cone shaped depressions formed therein;
   (b) a distribution plate, said distribution plate being operably associated with at least one of said generally cone shaped depressions;
   (c) an insert having at least one distribution orifice for distributing the flow of a fluid, at least a portion of said insert being positioned beneath said distribution plate, said insert being positioned at least partially within said at least one cone shaped depression;
   (d) at least a portion of said distribution plate being disposed within said insert;
   (e) a thimble formed in a bottom of at least one of said generally cone shaped depressions; and,
   (f) a removable anchoring member for removably anchoring said distribution plate to said bottom, said removable anchoring member includes upper and lower portions, said lower portion engages said thimble.

10. An underdrain system as set forth in claim 9, wherein:
    (a) said removable anchoring member includes a bolt and a toggle member.

11. An underdrain system as set forth in claim 10, wherein:
    (a) said toggle member is substantially U-shaped.

12. An underdrain system as set forth in claim 11, wherein:
    (a) said toggle member engages said thimble.

13. An underdrain system, comprising:
    (a) a bottom formed of concrete, said bottom having a plurality of depressions;
    (b) a distribution plate, said distribution plate being operably associated with at least one of said plurality of depressions;
    (c) an insert having at least one distribution orifice for distributing the flow of fluid, at least a portion of said insert being disposed beneath said distribution plate, said insert being disposed in at least one of said plurality of depressions; and,
    (d) an anchoring member for anchoring said distribution plate to said bottom, at least a portion of said anchoring member passes through said insert.

* * * * *